No. 781,381. Patented January 31, 1905.

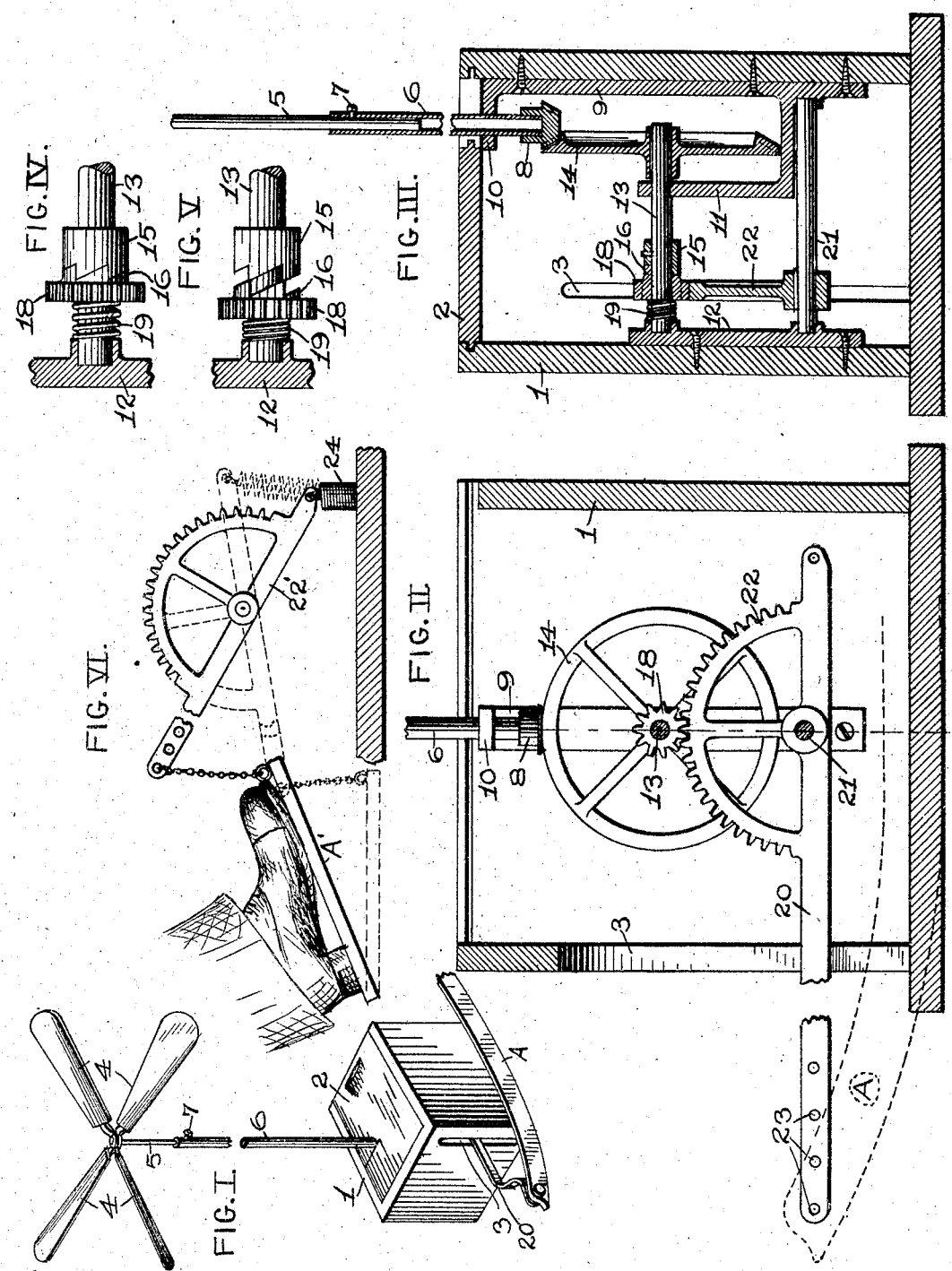

UNITED STATES PATENT OFFICE.

FRANK SUSEK, OF ST. LOUIS, MISSOURI.

MECHANICALLY-OPERATED FAN.

SPECIFICATION forming part of Letters Patent No. 781,381, dated January 31, 1905.

Application filed April 18, 1904. Serial No. 203,675.

*To all whom it may concern:*

Be it known that I, FRANK SUSEK, a citizen of the United States, residing in the city of St. Louis, in the State of Missouri, have invented certain new and useful Improvements in Mechanically-Operated Fans, of which the following is a full, clear, and exact description, reference being had to the accompanying drawings, forming part of this specification.

My invention relates to a fan and mechanism whereby the fan may be rotated when power is applied to the mechanism through the medium of the rocker of a rocking-chair or a foot-pedal.

Figure I is a perspective view of my fan. Fig. II is an enlarged vertical longitudinal section taken through the gearing-box of the fan-operating mechanism. Fig. III is an enlarged vertical cross-section taken through the gearing-box on line III III, Fig. II. Fig. IV is a view illustrating the clutches of the fan-operating mechanism in engagement. Fig. V is a view similar to Fig. IV, showing the clutch members disengaged. Fig. VI is an elevation illustrating the operation of the fan-operating mechanism through the medium of a foot-pedal.

1 designates a gearing-box having a lid 2 and provided at one end with a vertical slot 3. 4 designates the wings of a fan, that are secured to the upper end of a carrier-rod 5. The rod 5 is seated for vertical adjustment in a tubular driven shaft 6, in which said rod telescopes and is held by a set-screw 7. The driven shaft 6 extends downwardly through the top of the gearing-box 1 and has fixed to its lower end a bevel-pinion 8.

9 is a bracket-support mounted in the box 1 and having a horizontal arm 10, through which the driven shaft 6 passes, and a vertical arm 11.

12 is a bearing-plate secured to the inside of one of the box side walls opposite the bracket-support 9.

13 is a horizontal shaft rotatably mounted in the vertical bracket-support arm 11 and seated in a socket in the bearing-plate 12, as seen in Fig. III. Fixed to the shaft 13 is a bevel gearing-wheel 14, that meshes with the pinion 8, carried by the upright driven shaft 6.

15 is a toothed clutch member fixed to the horizontal driven shaft 13.

16 is a toothed clutch member loosely mounted on the shaft 13 in opposition to the clutch member 15. The member 16 carries a pinion 18, and it is backed by an expansion-spring 19, that tends to carry the loose clutch member toward the fixed clutch member.

20 designates a vertical oscillating lever that is mounted on a shaft 21, the ends of which have bearing in the bracket-support 9 and the bearing-plate 12. This oscillating lever bears a toothed segment 22, the teeth of which mesh with the teeth of the pinion 18. The outer end of the oscillating lever extends through the slot 3 in the gearing member and is adapted to be connected to the rocker A of a rocking-chair, as illustrated in Fig. I and dotted lines, Fig. II, the lever being preferably provided with a plurality of bolt-holes 23, through either of which a bolt may be passed to connect the lever to the chair-rocker. When the device is used in connection with a rocking-chair, the movement of the chair-rocker causes vertical oscillation of the oscillating lever 20, with the result that the segment 22 causes rotation to be imparted to the pinion 18 as the lever is moved in one direction, during which time the clutch member 16 remains in engagement with the clutch member 15 to rotate the horizontal driven shaft 13. The rotation of the shaft 13 is communicated to the bevel gear-wheel 14 and therefrom to the bevel-pinion 8 and upright shaft 6, fan-carrying rod 5, and the fan-wings, so that said wings will cause circulation of the air in which they turn. Each time that the segment 22 moves in a reverse direction from that in which it moves to impart rotation to the driven shaft 13 it imparts retrograde rotation to the pinion 18 and the clutch member by which said pinion is carried, so that said clutch member is backed away from the fixed clutch member 15, while said fixed clutch member and the driven shaft continue to rotate, this backing of the clutch member being permitted by the spring 19, which serves to return the clutch member to its normal position when the segment is again moved into driving direction.

In Fig. VI, I have shown a modification in which the oscillating lever designated as 22' has connected to one end a pedal A' in lieu of the chair-rocker A, and connected to the opposite end of the lever is a retracting-spring 24, that serves to return the lever to its previous position after it has been moved on the depression of the pedal by foot-power. It will be readily understood that this pedal may be connected to the mechanism illustrated in Figs. I to V, inclusive, and when so connected the fan-operating mechanism may be actuated by foot-power without the use of a rocking-chair.

I claim as my invention—

1. In a mechanically-operated fan, the combination of a box, a lower shaft and an upper shaft rotatably mounted in said box, an oscillating lever mounted upon said lower shaft and provided with a toothed segment, a clutch-pinion loosely mounted on said upper shaft and meshing with said segment, a clutch member fixed to said upper shaft to be engaged by said pinion, a bevel gear-wheel fixed to said upper shaft, a rotatable fan-support having its lower end rotatably mounted in said box and a bevel-pinion fixed to the lower end of said fan-support and meshing with said bevel gear-wheel, substantially as set forth.

2. In a mechanically-operated fan, the combination of a box, a bearing-plate and a bracket-support secured to the walls of said box at their inner sides, a bracket extending from said bracket-support, a lower shaft journaled in said bearing-plate and bracket-support, an upper shaft journaled in said bearing-plate and said bracket, an oscillating lever mounted on said lower shaft and provided with a toothed segment, a spring-controlled pinion slidably mounted on said upper shaft and provided with a clutch member, a clutch member fixed to said upper shaft to receive the engagement of the clutch member of said pinion, a bevel gear-wheel fixed to said upper shaft, a rotatable fan-support journaled in the upper end of said bracket-support, and a bevel-pinion fixed to the lower end of said fan-support and meshing with said bevel gear-wheel.

FRANK SUSEK.

In presence of—
  E. S. KNIGHT,
  BLANCHE HOGAN.